(12) United States Patent
Auston et al.

(10) Patent No.: US 8,550,429 B2
(45) Date of Patent: Oct. 8, 2013

(54) PNEUMATIC SAFETY COUPLER

(76) Inventors: Murray Auston, Morisset (AU);
Lindsay Auston, Morisset (AU)

( * ) Notice: Subject to any disclaimer, the term of this patent is extended or adjusted under 35 U.S.C. 154(b) by 59 days.

(21) Appl. No.: 12/989,850

(22) PCT Filed: Apr. 27, 2009

(86) PCT No.: PCT/AU2009/000522
§ 371 (c)(1),
(2), (4) Date: Nov. 23, 2010

(87) PCT Pub. No.: WO2009/132382
PCT Pub. Date: Nov. 5, 2009

(65) Prior Publication Data
US 2011/0057438 A1  Mar. 10, 2011

(30) Foreign Application Priority Data
Apr. 28, 2008 (AU) ................................. 2008902046

(51) Int. Cl.
*F16L 37/28* (2006.01)
(52) U.S. Cl.
USPC ...................................... 251/149.1; 251/149.9
(58) Field of Classification Search
USPC ............ 251/82, 95, 98, 111, 114, 115, 141.1, 251/149.6, 149.9, 149.1, 149.8; 137/614.06
See application file for complete search history.

(56) References Cited

U.S. PATENT DOCUMENTS

| 3,583,667 | A | * | 6/1971 | Amneus, Jr. ................ 251/149.5 |
| 3,664,634 | A | * | 5/1972 | Guertin et al. ................ 251/333 |
| 5,026,024 | A | * | 6/1991 | Ito ................................. 251/149.5 |
| 5,301,985 | A | * | 4/1994 | Terzini ............................. 285/79 |
| 5,779,277 | A |   | 7/1998 | Street |
| 6,032,926 | A | * | 3/2000 | Fuchs ........................ 251/149.4 |
| 6,279,874 | B1 |  | 8/2001 | Nyberg |
| 7,147,004 | B1 | * | 12/2006 | Hartman ................... 137/614.06 |
| 7,793,914 | B2 | * | 9/2010 | Danielson .................. 251/149.9 |
| 2004/0094739 | A1 | * | 5/2004 | Lacroix et al. .............. 251/149.1 |
| 2007/0235092 | A1 | * | 10/2007 | Danielson et al. ............ 137/614 |

FOREIGN PATENT DOCUMENTS

EP          0233766 A2     8/1987

OTHER PUBLICATIONS

PCT International Search Report of PCT/AU2009/000522 Dated: Jul. 14, 2009.

* cited by examiner

*Primary Examiner* — John K Fristoe, Jr.
*Assistant Examiner* — Reinaldo Sanchez-Medina
(74) *Attorney, Agent, or Firm* — Abelman, Frayne, Schwab

(57) ABSTRACT

A coupling assembly for a compressed air circuit has locking device for releasably engaging first and second sub-assemblies located at respective ends of first and second air lines. The first air line is connected to a tool adapted for compressed air operation, and the second air line is connected to a supply of compressed air. A valve controls the flow of compressed air between the first and second air lines. The valve is connected to the second sub-assembly and is slidably movable between a first position where it allows compressed air flow, and a second position where it prevents compressed air flow. The coupling assembly has stop element for preventing disengagement of the first and second sub-assemblies when the valve is in the first position.

16 Claims, 4 Drawing Sheets

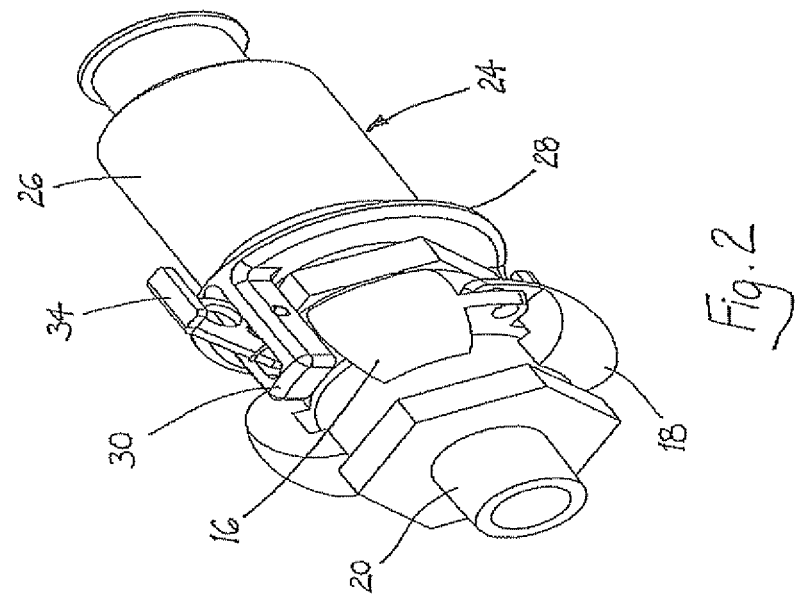
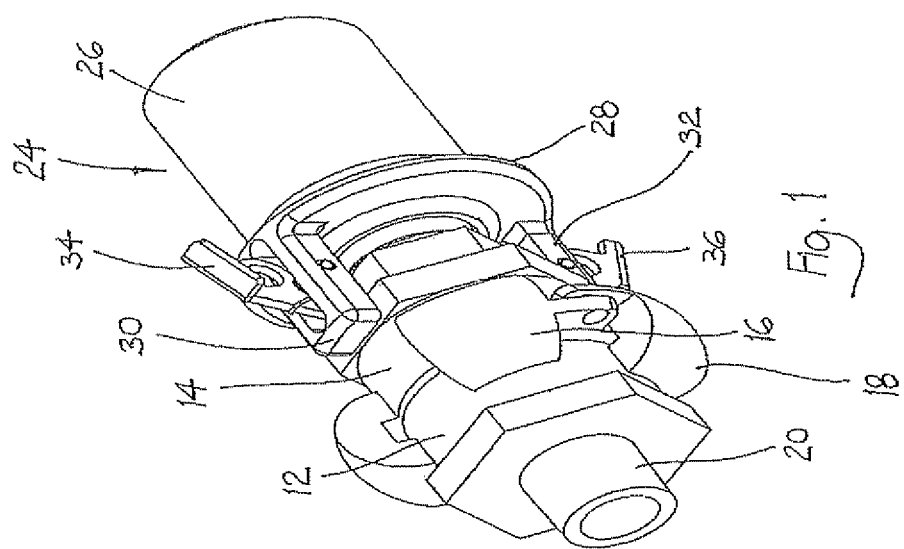
Fig. 1
Fig. 2

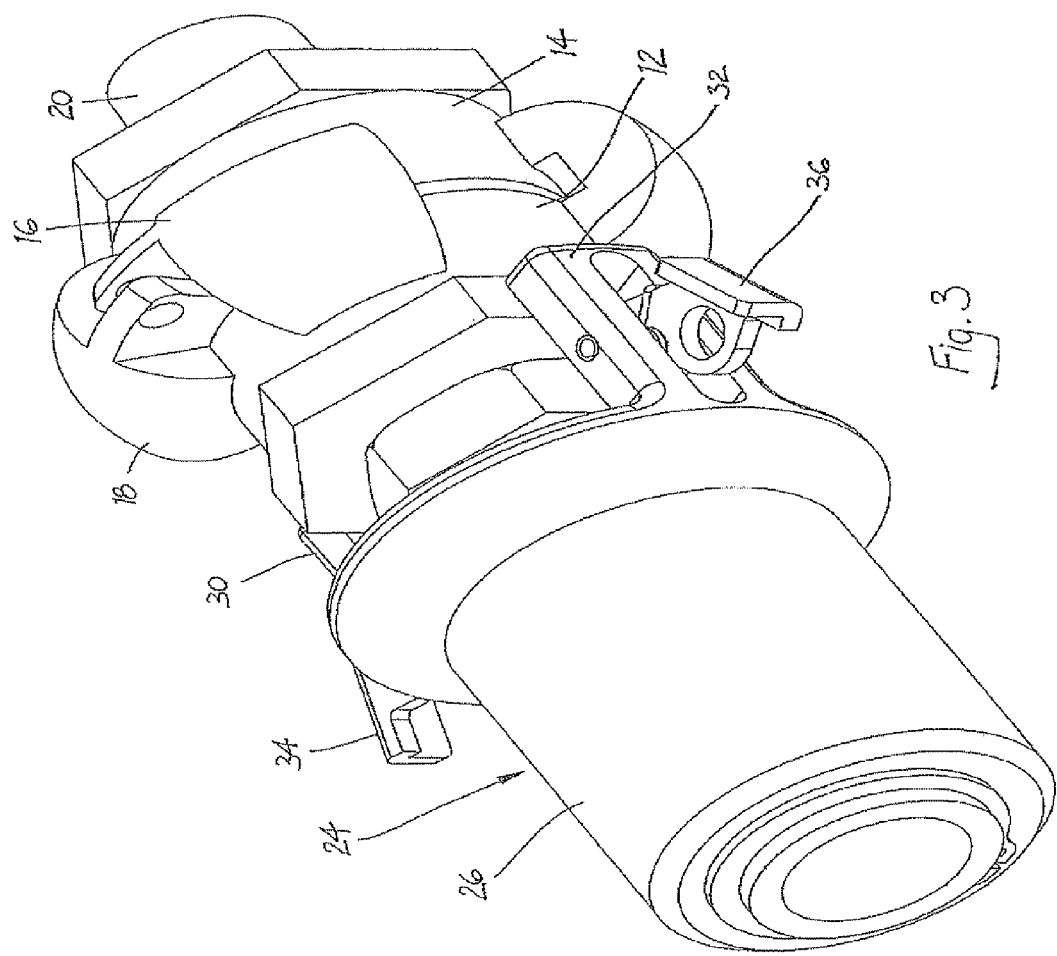

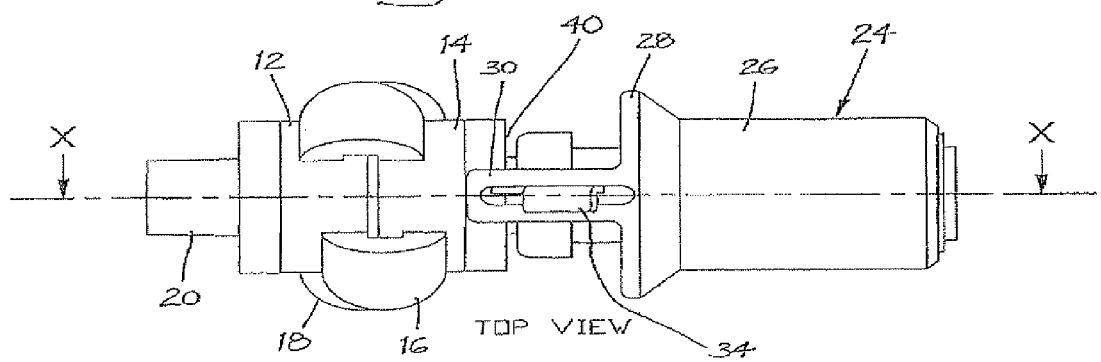
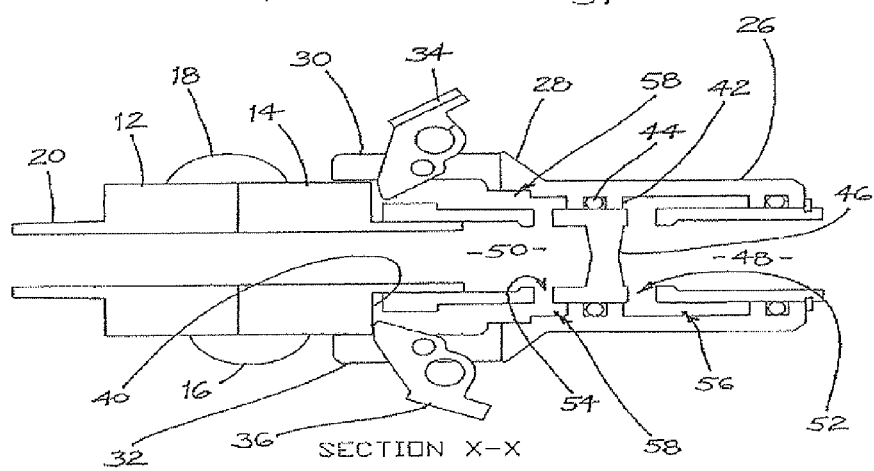

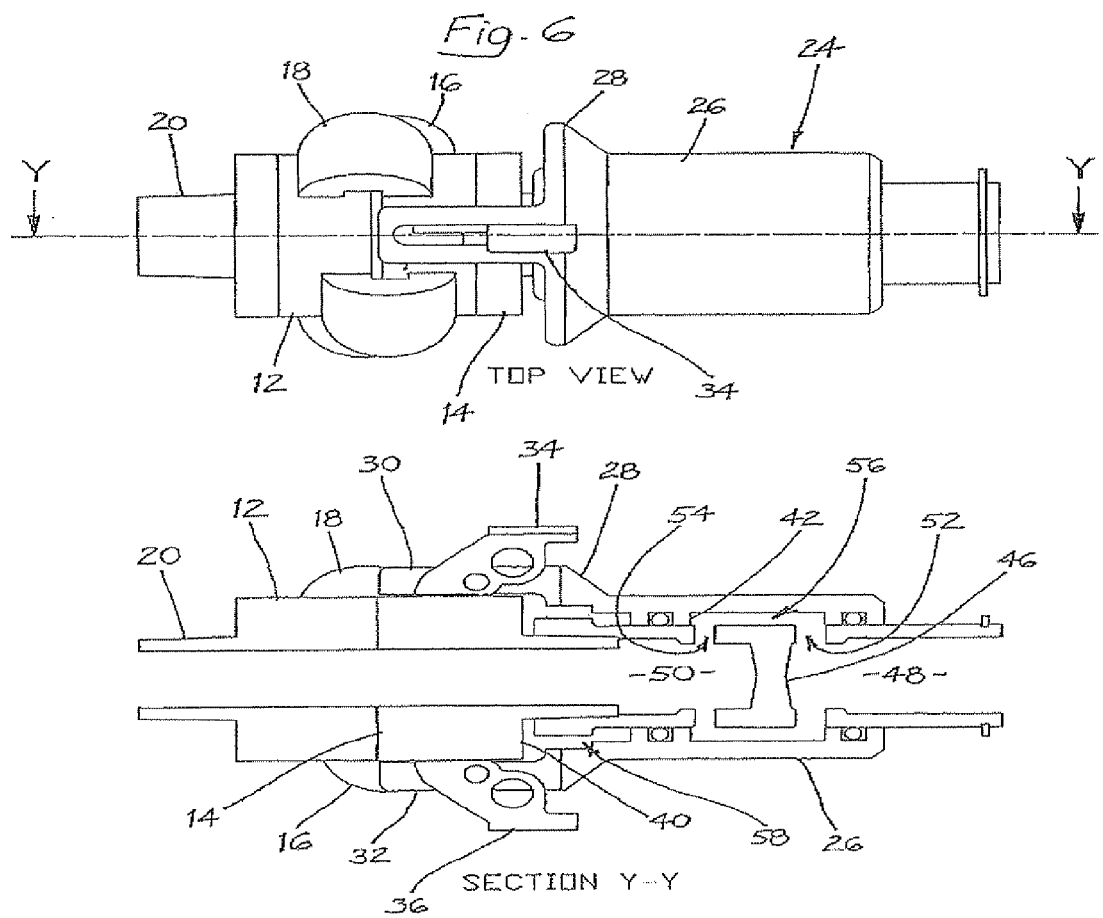

PNEUMATIC SAFETY COUPLER

This application claims priority under 35 U.S.C. §119, 120 and/or 365 to PCT/AU 2009/000522 filed 27 Apr. 2009 and AU 2008/902046 filed 28 Apr. 2008.

TECHNICAL FIELD

The present invention relates to safety couplers for compressed air lines and, in particular, to a coupling assembly that has an air isolation valve for local shut off and venting of compressed air from a compressed air circuit.

BACKGROUND ART

It is common practice to supply compressed air to mines, building sites and through manufacturing plants via an air line of interconnecting pipes and hoses. Compressed air is used to operate machinery, such as packaging machines, rock drilling machines, and portable tools, and for starting some diesel mobile plant. It is a convenient, flexible, high energy source that can be quickly installed, used and dismantled as required.

The connection of the air line of pipes and hoses is via a range of quick connect couplers or bolted joints. A common coupler is a "claw" coupler, which allows an operator to "twist and lock" a hose onto an air supply valve, connect two hoses together, or connect a hose to a machine.

Air is controlled (i.e. turned on and off) by the use of isolation or control valves. These valves can be manually operated by hand, can be electrically controlled, or can be operated by other methods.

However, there are numerous problems and dangers associated with the use of compressed air. This is largely due to the flexible, high energy nature of compressed air which, when combined with poor practices, have, in the past, resulted in major injury and death.

Death has been attributed to impact injury (disconnected hoses flailing around), and compressed air injection into the bloodstream. Injuries associated with compressed air include air injection, and both temporary and permanent hearing loss.

The following method is an example of the use of compressed air as commonly occurs on a building site, and indicates some problems and dangers that exist both in normal use and when operators fail to follow normal practice.

A mobile air compressor is located adjacent a pit requiring excavation and remote from an operator. The problem here is that the source of compressed air and the control valve associated with the compressor are not located where the work is being carried out at the free end of the hose, and so if a fault arises, such as when a flexible hose ruptures, the compressed air cannot be quickly turned off.

The compressor is connected via a 50 m hose to a portable jack hammer. The operator connects the hose firstly to the compressor, then holds the free end of the hose whilst compressed air is used to purge or clean the flexible line.

This process requires the operator to connect the hose to the compressor and then fit a secondary (separate) locking clip. This locking clip is used to prevent inadvertent unlocking of the hoses caused by hose tension when turning on air supply. This can be due to the fact that hoses are delivered neatly coiled and, when air pressure is applied, the hose naturally untwists thus causing the "twist and lock" couplers to disconnect.

To purge or clean the hose requires the operator to travel to the compressor (where the air control valve is fitted) whilst holding the free end of the hose, or to involve another person near the compressor to turn the air supply on and off.

Although a 50 m hose is used in this example, in practice the compressor and jackhammer or other tool may be connected by 500 m or more of hose.

After purging the line, the operator connects the jack hammer, and turns on the air supply in order to remove the rock.

This process requires that, if the operator is by himself, he has to drag the hose to the jackhammer, connect up the tool using the secondary locking clip for safety, and then travel back to the compressor, once again, to turn the compressed air on, so work can begin. Whilst he is turning on the air supply, the operator is not at the tool site and therefore cannot see if any problems exist, e.g. air leaks or hose problems.

At completion of the job, the operator turns off the air, operates the jack hammer to dissipate the trapped air in the hose, or releases the air through a drain valve, then proceeds to disconnect the tool and hose from the compressor.

This process requires the operator to travel to the compressor and turn off the air, then travel back to the tool to release the trapped air in the hose, or release the air through the drain valve. Using the drain valve releases air at a high velocity, resulting in noise that may permanently damage hearing. This high velocity air, when directed at the ground, can cause loose debris (rocks and dust) to be violently blown around, sometimes resulting in impact injuries to the body or to the eyes in particular.

Once the tool is disconnected, there is a danger that the air supply may be unknowingly turned on allowing the free end of the hose to flail around uncontrollably.

Aside from the problems and dangers associated with the above method, operators may take shortcuts which can also give rise to problems and dangers. These shortcuts include:—
  (a) use of a screwdriver or similar pointed tool to force the seal of the "claw" coupler apart to relieve the trapped pressure (instead of returning to the tool and operating it to exhaust air);
  (b) engaging a second person to crimp off the hose using their hands whilst the operator disconnects and reconnects the hose. This is particularly hazardous as air is only isolated for the time the second person can continue to maintain the crushing force on the hose. If that person trips or their hand grip slips whilst holding the hose, then air is released with uncontrolled force and speed.

Both (a) and (b) above can allow air to be released from a pressurised state quite rapidly, which will have the effect of generating a noise level that can cause permanent hearing loss.

Other steps taken to overcome the problems identified above are:
  (c) Some operators fit control valves with manual lever handles at hose ends. This can create problems when air is turned off and not released out of the hose, as there is no indication that the hose contains trapped air under pressure. This can only be identified by operation of the machine, which can cause unexpected or unwanted movement. Also, when the hose is dragged from one site to another, the lever handle can be caught and the air unexpectedly turned on.
  (d) Some operators fit venting valves at the compressor or source end of the air supply system. This does relieve the operator of some travel when removing the equipment from service, but still requires the operator to travel back to the source.
  (e) Some operators fit control valves with provision for padlocking the valve in a closed position. This solves the problem when the distance between the source and the tool is relatively short, but does not fix it when there is considerable distance between the source and the tool.

(f) Some operators fit silencers to the fixed venting valves located at the compressor end of the hose, which effectively eliminates the hearing damage risk. This solves part of the problem but is impractical to fit in all situations.

In summary, the problems encountered in the prior art include:
1. Control valves and tools are often a considerable distance apart, leading to shortcuts and non-adherence to normal practice.
2. Twist and lock couplers can become separated if the locking clip is not installed.
3. Locking clips are a separate item requiring the operator to carry them to safely do the job.
4. Hoses can be inadvertently uncoupled under pressure, as the presence of air pressure is not apparent and there is no interlock requiring the operator to release the pressure.
5. Venting devices fitted are sometimes remote from the tool.
6. Silencers fitted are sometimes remote of the tool.
7. Additional operators required if considerable distance between compressor and tool.

It is, therefore, an object of the present invention to overcome at least some of the aforementioned problems of the prior art.

DISCLOSURE OF INVENTION

According to the present invention, there is provided a coupling assembly for a compressed air circuit comprising:—
(a) locking means for releasably engaging first and second sub-assemblies located at respective ends of first and second air lines, the first air line being connected to a tool adapted for compressed air operation, and the second air line being connected to a supply of compressed air, and
(b) valve means for controlling the flow of compressed air between the first and second air lines, the valve means being connected to the second sub-assembly and being slidably movable between a first position where it allows compressed air flow, and a second position where it prevents compressed air flow.

Preferably, the coupling assembly further includes stop means for preventing disengagement of the first and second sub-assemblies when the valve means is in the first position.

In a preferred form, the locking means includes first and second locking claws being twistable between locked and unlocked positions, and the stop means includes a pair of stop arms which, when the valve means is in the first position, prevent the locking claws being twisted to their unlocked positions.

It is preferred that the coupling assembly further includes latch means for selectively preventing movement of the valve means from the second position to the first position.

In a further preferred form, the latch means comprise a pair of latch pins which are pivotally mounted to the stop arms.

BRIEF DESCRIPTION OF THE DRAWINGS

In order that the invention may be more readily understood and put into practical effect, reference will now be made to the accompanying drawings, in which:—

FIG. 1 is a front perspective view of a coupling assembly for a compressed air circuit according to a preferred embodiment of the invention, with the valve means of the coupling assembly shown in the second position where it prevents compressed air flow, FIG. 2 is a front perspective view of the coupling assembly of FIG. 1, with the valve means of the coupling assembly shown in the first position where it allows compressed air flow, FIG. 3 is a rear perspective view of the coupling assembly as shown in FIG. 1, FIG. 4 is a plan view of the coupling assembly as shown in FIG. 1, FIG. 5 is a simplified sectional view through X-X of the coupling assembly as shown in FIG. 4, FIG. 6 is a plan view of the coupling assembly as shown in FIG. 2, and FIG. 7 is a simplified sectional view through Y-Y of the coupling assembly as shown in FIG. 6.

MODES FOR CARRYING OUT THE INVENTION

The coupling assembly shown in the drawings has a first sub-assembly 12 and a second sub-assembly 14 which are releasably engaged by locking means which, in this embodiment, are in the form of a first locking claw 16 of the first sub-assembly 12 and a second locking claw 18 of the second sub-assembly 14. The first and second locking claws 16, 18 are twistable between locked and unlocked positions.

The first sub-assembly 12 is located at one end of a first air line, and at the other end of the first air line is connected a tool adapted for compressed air operation, such as a jackhammer. An outwardly threaded tube 20 of the first sub-assembly 12 is adapted for connecting to an inwardly threaded nut at the adjoining end of the first air line.

The second sub-assembly 14 is located at one end of a second air line, and at the other end of the second air line is connected a supply of compressed air, such as an air compressor machine.

Also connected to the second sub-assembly is a valve means for controlling the flow of compressed air between the first and second air lines. The valve means is, in this embodiment, in the form of a sleeve 24 having a body portion 26 and a flared collar 28. Stop means which, in this embodiment, are in the form of stop arms 30, 32, are integrally connected to the flared collar 28 of the sleeve 24. Latch means which, in this embodiment, are in the form of latch pins 34, 36 are pivotally mounted to respective stop arms 30, 32.

The sleeve 24 is slidably movable between a first position (as shown in FIG. 2) where it allows compressed air flow between the first and second air lines, and a second position (as shown in FIG. 1) where it prevents compressed air flow between the first and second air lines. The valve-like control of compressed air flow provided by the movement of the sleeve 24 relative to the second sub-assembly will be described in detail later in the specification.

The stop arms 30, 32 prevent disengagement of the first and second sub-assemblies 12, 14 when the sleeve 24 is in its first position, because the stop arms 30, 32 are located in a position where they prevent the locking claws 16, 18 being twisted to their unlocked positions. Disengagement of the first and second sub-assemblies can only be achieved by manually moving the stop arms 30, 32 to a position where they no longer prevent twisting of the locking claws to their unlocked positions.

The latch pins 34, 36 selectively prevent movement of the sleeve 24 from its second position to its first position, because the latch pins 34, 36 are biased to pivot to a position where they abut against an obstructing wall of the second sub-assembly when the sleeve 24 is in its second position. Restoration of compressed air flow can only be achieved between the first and second air lines by manually pivoting the latch pins 34, 36 to respective positions where they no longer abut against the obstructing wall and then sliding the sleeve 24 to its first position.

The above described coupling assembly, when including the aforementioned stop means and latch means, can provide an air isolation valve for local shutoff and venting of compressed air from a compressed air circuit, as well as a noise dampening effect when venting compressed air, and a high level of safety against accidental disengagement of the first and second sub-assemblies and accidental restoration of compressed air flow therebetween.

In use, the first and second sub-assemblies are engaged by a user twistably locking the first and second locking claws 16, 18 together. The sleeve 24, which is connected to the second sub-assembly, is in its second position as the claws are locked together, whereby compressed air flow through the air lines is prevented. The sleeve 24 is prevented from slidably moving to its first position by the latch pins 34, 36 which abut against the wall 40 of the second sub-assembly. This position of the latch pins is shown in FIGS. 4 and 5, as is the position of the sleeve. A padlock may be engaged through one of the latch pins to prevent their pivotal movement.

The sleeve 24 has an annular air flow cavity 56 and an annular air vent cavity 58 that are divided by an isolator wall 42 that includes O-ring seal 44 which, when the sleeve is in its second position, provides an airtight sealing against a dividing wall 46 of the second sub-assembly. The dividing wall 46 separates an air-in, pressurised chamber 48 of the second sub-assembly from an air-out, unpressurised or atmospheric chamber 50 of the second sub-assembly, and the two chambers 48, 50 have air flow ports 52, 54 respectively. The airtight sealing of the isolator wall 42 against the dividing wall 46 prevents compressed air flow from the pressurised chamber 48 to the atmospheric chamber 50 via their respective air flow ports 52, 54.

To allow compressed air flow through the air lines, the user presses down on the latch pins so that they pivot to respective positions where they no longer abut against the wall 40, and simultaneously grips the body portion 26 of the sleeve 24 before sliding the sleeve 24 forward to its first position, whereby compressed air flow through the air lines is allowed. The new position of the latch pins and the sleeve is shown in FIGS. 6 and 7, as is the position of the isolator wall 42 relative to the pressurised chamber 48 and atmospheric chamber 50.

Compressed air can now flow from the pressurised chamber 48 to the atmospheric chamber 50 unimpeded by the isolator wall 42 which has moved forward with the sleeve 24, thereby also moving the air flow cavity 56 forward to allow air flow communication between the ports 52, 54. The tool is then supplied with compressed air via the air lines from the air compressor machine, and can be operated.

Sliding the sleeve 24 forward to its first position also allows the stop arms 30, 32 to locate between interlocking pairs of first and second locking claws, whereby the locking claws are prevented from being twisted to their unlocked positions.

Should a problem arise, such as with the operation of the tool or with the integrity of the air lines from the air compressor machine, the user can quickly isolate or shut off the flow of compressed air to the tool by simply sliding the sleeve rearwardly to its second position. This shut off of compressed air is done locally at the site of operation of the tool. As soon as the supply of compressed air through the coupling assembly to the tool is shut off, the compressed air isolated in the first air line between the tool and the coupling assembly is quickly vented to atmosphere by safely escaping through air flow port 54 and then through the air vent cavity 58 which are located under the front of the body portion and the flared collar 28 of the sleeve 24. The sleeve 24 thus serves as a silencer because of the noise dampening effect provided by the body portion and flared collar during venting of compressed air.

A padlock may then be engaged through one of the latch pins to prevent their accidental pivotal movement back to a position where the sleeve can dangerously slide forward before the tool is ready for operation.

The locking claws 16, 18 may also now be twisted to their unlocked positions, if required, to release the first and second sub-assemblies from their engagement, because the stop arms are no longer located between the interlocking pairs of first and second locking claws. This will allow the air lines to be disconnected.

If the user wants to use the second air line from the air compressor machine to "blow down" a tool for cleaning or maintenance purposes, the first and second sub-assemblies can be disengaged or uncoupled without any escape of compressed air from the second air line, and the sleeve 24 on the second sub-assembly can then be slid forward to allow compressed air to flow from the pressurised chamber 48 to the atmospheric chamber 50, before it blows out of the open end of the second sub-assembly.

It will be readily apparent to persons skilled in the art that various modifications may be made in details of design and construction of the coupling assembly for a compressed air circuit described above without departing from the scope or ambit of the present invention.

The invention claimed is:

1. A coupling assembly for a compressed air circuit comprising:
   (a) locking means for releasably engaging first and second sub-assemblies located at respective ends of first and second air lines, the first air line being connected to a tool adapted for compressed air operation, and the second air line being connected to a supply of compressed air,
   (b) valve means for controlling the flow of compressed air between the first and second air lines, the valve means being connected to the second sub-assembly and being slidably movable between a first position where it allows compressed air flow, and a second position where it prevents compressed air flow, such that when the locking means are engaged, the valve means can be positioned in either the first position or the second position, and
   (c) stop means for preventing disengagement of the first and second sub-assemblies when the valve means is in the first position,
   where said locking means includes pairs of first and second locking claws being twistable between locked and unlocked positions, and
   where said stop means includes a pair of stop arms which, when the valve means is in the first position, are slid between interlocking pairs of first and second locking claws so as to prevent the locking claws being twisted to their unlocked positions, and when the valve means is in the second position, are slid away from between interlocking pairs of first and second locking claws so as to allow twisting of the locking claws to their unlocked positions.

2. The coupling assembly of claim 1 further including latch means for selectively preventing movement of the valve means from the second position to the first position.

3. The coupling assembly of claim 2 wherein the latch means comprise a pair of latch pins which are pivotally mounted to the stop arms.

4. The coupling assembly of claim 3 wherein the latch pins are biased to pivot to a position where they abut against an obstructing wall of the second sub-assembly when the sleeve is in its second position.

5. The coupling assembly of claim 2 wherein the valve means is a sleeve having a body portion and a flared collar.

6. The coupling assembly of claim 5 wherein the stop arms are integrally connected to the flared collar.

7. The coupling assembly of claim 5 wherein the sleeve has an annular air flow cavity and an annular air vent cavity that are divided by an isolator wall that includes a sealing means which, when the sleeve is in its second position, provides an airtight sealing against a dividing wall of the second sub-assembly.

8. The coupling assembly of claim 7 wherein the dividing wall separates an air-in pressurized chamber of the second sub-assembly from an air-out, atmospherically pressured chamber of the second sub-assembly, and each of the two chambers have air flow ports, and wherein the airtight sealing of the isolator wall against the dividing wall prevents compressed air flow from the pressurized chamber to the atmospherically pressured chamber via the air flow ports.

9. A coupling assembly for a compressed air circuit operable with first and second air lines each having an inlet end and an outlet end,
   said first air line having its outlet end connectible to a tool adapted for compressed air operation and its inlet end connectible to a second coupling sub-assembly,
   said second air line having its inlet end connectible to a supply of compressed air and its outlet end connectible to said first coupling sub-assembly, comprising:
   (a) a locking device on said second coupling sub-assembly for releasably connecting together said first and second coupling sub-assemblies,
   (b) a valve for controlling the flow of compressed air between said first and second air lines, said valve being coupled to said second sub-assembly and being slidably movable between a first position where it allows compressed air flow and a second position where it prevents compressed air flow, such that when the locking device has connected together the first and second coupling sub-assemblies, the valve can be positioned in either the first position or the second position,
   (c) said locking device further comprising: (i) locking claws movable between a first position for preventing disconnection of said first and second sub-assemblies when said valve is in its first position, and a second position which allows said disconnection when said valve is in its second position, and (ii) a stop element including a pair of stop arms selectively movable to a first position where they prevent said locking claws from being moved to their unlocked positions, and a second position where they no longer prevent said movement of the locking claws to their unlocked positions.

10. The coupling assembly of claim 9 further including a latch for selectively preventing movement of said valve from the second position to the first position.

11. The coupling assembly of claim 10 wherein the valve is a sleeve that has a body portion and a flared collar.

12. The coupling assembly of claim 11 wherein the stop arms are integrally connected to the flared collar.

13. The coupling assembly of claim 11 wherein the sleeve has an annular air flow cavity and an annular air vent cavity that are divided by an isolator wall that includes a seal element which, when the sleeve is in its second position, provides an airtight seal against a dividing wall of the second sub-assembly.

14. The coupling assembly of claim 13 wherein the dividing wall separates an air-in pressurized chamber of the second sub-assembly from an air-out, atmospherically pressured chamber of the second sub-assembly, and each of the two chambers have air flow ports, and wherein the airtight sealing of the isolator wall against the dividing wall prevents compressed air flow from the pressurized chamber to the atmospherically pressured chamber via the air flow ports.

15. A coupling assembly for a compressed air circuit operable with first and second air lines each having an inlet end and an outlet end,
   said first air line having its outlet end connectible to a tool adapted for compressed air operation and its inlet end connectible to a second coupling sub-assembly,
   said second air line having its inlet end connectible to a supply of compressed air and its outlet end connectible to said first coupling sub-assembly, comprising:
   (a) a locking device on said second coupling sub-assembly for releasably connecting together said first and second coupling sub-assemblies,
   (b) a valve for controlling the flow of compressed air between said first and second air lines, said valve being coupled to said second sub-assembly and being slidably movable between a first position where it allows compressed air flow and a second position where it prevents compressed air flow, such that when the locking device has connected together the first and second coupling sub-assemblies, the valve can be positioned in either the first position or the second position,
   said locking device further comprising: (i) locking claws movable between a first position for preventing disconnection of said first and second sub-assemblies when said valve is in its first position, and a second position which allows said disconnection when said valve is in its second position, and (ii) a stop element including a pair of stop arms selectively movable to a first position where they prevent said locking claws from being moved to their unlocked positions, and a second position where they no longer prevent said movement of the locking claws to their unlocked positions,
   (c) a latch for selectively preventing movement of said valve from the second position to the first position,
   wherein the latch comprises a pair of latch pins which are pivotally mounted to the stop arms.

16. A coupling assembly for a compressed air circuit operable with first and second air lines each having an inlet end and an outlet end,
   said first air line having its outlet end connectible to a tool adapted for compressed air operation and its inlet end connectible to a second coupling sub-assembly,
   said second air line having its inlet end connectible to a supply of compressed air and its outlet end connectible to said first coupling sub-assembly, comprising:
   (a) a locking device on said second coupling sub-assembly for releasably connecting together said first and second coupling sub-assemblies,
   (b) a valve for controlling the flow of compressed air between said first and second air lines, said valve being coupled to said second sub-assembly and being slidably movable between a first position where it allows compressed air flow and a second position where it prevents compressed air flow, such that when the locking device has connected together the first and second coupling sub-assemblies, the valve can be positioned in either the first position or the second position;

said locking device further comprising: (i) locking claws movable between a first position for preventing disconnection of said first and second sub-assemblies when said valve is in its first position, and a second position which allows said disconnection when said valve is in its second position, and (ii) a stop element including a pair of stop arms selectively movable to a first position where they prevent said locking claws from being moved to their unlocked positions, and a second position where they no longer prevent said movement of the locking claws to their unlocked positions, and (c) a latch for selectively preventing movement of said valve from the second position to the first position, wherein said latch comprises a pair of latch pins which are pivotally mounted to the stop arms, and wherein said latch pins are biased to pivot to a position where they abut against an obstructing wall of the second sub-assembly when the sleeve is in its second position.

* * * * *